US012598669B2

(12) United States Patent 　(10) Patent No.: US 12,598,669 B2
Agiwal et al. 　(45) Date of Patent: Apr. 7, 2026

(54) METHOD OF HANDLING ACTIVE TIME FOR SL COMMUNICATION

(71) Applicant: Samsung Electronics Co., Ltd., Gyeonggi-do (KR)

(72) Inventors: Anil Agiwal, Gyeonggi-do (KR); Hyunjeong Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 18/257,206

(22) PCT Filed: Dec. 15, 2021

(86) PCT No.: PCT/KR2021/019045
§ 371 (c)(1),
(2) Date: Jun. 13, 2023

(87) PCT Pub. No.: WO2022/131781
PCT Pub. Date: Jun. 23, 2022

(65) Prior Publication Data
US 2024/0049341 A1 　Feb. 8, 2024

(30) Foreign Application Priority Data

Dec. 15, 2020 　(KR) ........................ 10-2020-0175483

(51) Int. Cl.
*H04W 76/28* 　(2018.01)
*H04B 7/06* 　(2006.01)
(Continued)

(52) U.S. Cl.
CPC .......... *H04W 76/28* (2018.02); *H04B 7/0626* (2013.01); *H04L 1/188* (2013.01); *H04W 72/25* (2023.01)

(58) Field of Classification Search
None
See application file for complete search history.

(56) References Cited

U.S. PATENT DOCUMENTS 9,949,164 B2 　4/2018 　Heo et al.
11,044,066 B2 　6/2021 　Lee et al.
(Continued)

FOREIGN PATENT DOCUMENTS

EP 　3 855 861 　7/2021
WO 　WO 2020/190068 　9/2020
(Continued)

OTHER PUBLICATIONS

Vivo, "Resource Allocation for Sidelink Power Saving", R1-2007688, 3GPP TSG RAN WG1 #103-e, Oct. 26-Nov. 13, 2020, 9 pages.
(Continued)

*Primary Examiner* — Walter J Divito
(74) *Attorney, Agent, or Firm* — The Farrell Law Firm, P.C.

(57) ABSTRACT

The disclosure provides a method for sidelink channel state information (CSI) reporting in a wireless communication system. The method comprises steps in which: a user equipment (UE) obtains parameters associated with discontinuous reception (DRX); the UE transmits, to a peer UE, a CSI request; and the UE monitors a sidelink channel in an active time of the DRX for receiving, from the peer UE, sidelink CSI in response to the CSI request, wherein the active time of the DRX includes a time duration between transmitting the CSI request and receiving the sidelink CSI.

8 Claims, 12 Drawing Sheets

(51) Int. Cl.
_H04L 1/1867_ (2023.01)
_H04W 72/25_ (2023.01)

(56) References Cited

U.S. PATENT DOCUMENTS

| | | | | |
|---|---|---|---|---|
| 2020/0322024 | A1 | 10/2020 | Cheng et al. | |
| 2021/0227464 | A1* | 7/2021 | Kung | H04W 76/14 |
| 2023/0209644 | A1* | 6/2023 | Han | H04W 52/0274 |
| | | | | 370/328 |

FOREIGN PATENT DOCUMENTS

| | | |
|---|---|---|
| WO | WO 2020/200079 | 10/2020 |
| WO | WO 2021/248450 | 12/2021 |

OTHER PUBLICATIONS

Huawei, HiSilicon, "Discussion on Remaining MAC open Issues for 5G V2X with NR SL", R2-2005492, 3GPP TSG-RAN WG2 Meeting #110-e, Jun. 1-12, 2020, 44 pages.

Huawei, HiSilicon, "Consideration on the Sidelink DRX for Unicast, Groupcast and Broadcast", R2-2009413, 3GPP TSG-RAN WG2 Meeting #112-e, Nov. 2-13, 2020, 8 pages.

European Search Report dated Mar. 5, 2024 issued in counterpart application No. 21907085.1-1215, 16 pages.

PCT/ISA/210 Search Report issued on PCT/KR2021/019045, Mar. 10, 2022 pp. 3.

PCT/ISA/237 Written Opinion issued on PCT/KR2021/019045, Mar. 10, 2022 pp. 3.

Oppo, "The effect of DRX on resource selection", 3GPP TSG RAN WG1 #103-e R1-2008241 e-Meeting, Oct. 26-Nov. 13, 2020, pp. 3.

Lenovo, Motorola Mobility, "Discontinuous reception and transmission in SL", 3GPP TSG-RAN WG2 Meeting #112 electronic R2-2009696 Online, Nov. 2-13, 2020, pp. 7.

Vivo, "Discussion on sidelink DRX", 3GPP TSG-RAN WG1 Meeting #103-e R1-2007690 e-Meeting, Oct. 26-Nov. 13, 2020, pp. 5.

* cited by examiner

METHOD OF HANDLING ACTIVE TIME FOR SL COMMUNICATION

PRIORITY

This application is a National Phase Entry of PCT International Application No. PCT/KR2021/019045, which was filed on Dec. 15, 2021, and claims priority to Korean Patent Application No. 10-2020-0175483, which was filed on Dec. 15, 2020, the entire content of each of which is incorporated herein by reference.

TECHNICAL FIELD

The disclosure relates to a field of sidelink communications. More particularly, the disclosure relates to method of handling active time of sidelink DRX for sidelink communications.

BACKGROUND ART

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (e.g., mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The disclosure provides a method for sidelink communications between UEs. More particularly, the disclosure provides a method of handling active time of sidelink DRX for sidelink communications.

Solution to Problem

According to an embodiment of the disclosure to solve the above problems, a method for receiving, by a user equipment (UE), sidelink channel state information (CSI) in a wireless communication system comprises: obtaining parameters associated with discontinuous reception (DRX);

transmitting, to a peer UE, a CSI request; and monitoring a sidelink channel in an active time of the DRX for receiving, from the peer UE, sidelink CSI in response to the CSI request, wherein the active time of the DRX includes a time duration between transmitting the CSI request and receiving the sidelink CSI.

According to an embodiment of the disclosure, a method for reporting, by a user equipment (UE), sidelink channel state information (CSI) in a wireless communication system comprises: receiving, from a peer UE with discontinuous reception (DRX), a CSI request; and transmitting, to the peer UE, sidelink CSI in response to the CSI request, wherein the sidelink CSI is transmitted in an active time of the DRX configured to the peer UE, and wherein the active time of the DRX includes a time duration between receiving the CSI request and transmitting the sidelink CSI.

According to an embodiment of the disclosure, a user equipment (UE) for receiving sidelink channel state information (CSI) in a wireless communication system, the UE comprises: a transceiver; and a controller functionally connected to the transceiver, wherein the controller is configured to: obtain parameters associated with discontinuous reception (DRX); transmit, to a peer UE via the transceiver, a CSI request; and monitor a sidelink channel in an active time of the DRX to receive, from the peer UE via the transceiver, sidelink CSI in response to the CSI request, wherein the active time of the DRX includes a time duration between transmitting the CSI request and receiving the sidelink CSI.

According to an embodiment of the disclosure, a user equipment (UE) for reporting sidelink channel state information (CSI) in a wireless communication system, the UE comprises: a transceiver; and a controller functionally connected to the transceiver, wherein the controller is configured to: receive, from a peer UE with discontinuous reception (DRX) via the transceiver, a CSI request; and transmit, to the peer UE via the transceiver, sidelink CSI in response to the CSI request, wherein the sidelink CSI is transmitted in an active time of the DRX configured to the peer UE, and wherein the active time of the DRX includes a time duration between receiving the CSI request and transmitting the sidelink CSI.

Advantageous Effects of Invention

According to an embodiment of the disclosure, the terminal can avoid missing SL CSI report when DRX is configured.

According to an embodiment of the disclosure, the terminal can avoid missing HARQ feedback reception on PSFCH, when DRX is configured.

According to an embodiment of the disclosure, when DRX is configured, UE can monitor S-PSS, S-SSS and PSBCH irrespective of whether UE is in active time or not.

Effects which may be obtained in the disclosure are not limited to the above-described effects, and other technical effects not described above may be evidently understood by a person having ordinary skill in the art to which the present disclosure pertains from the following description.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1:
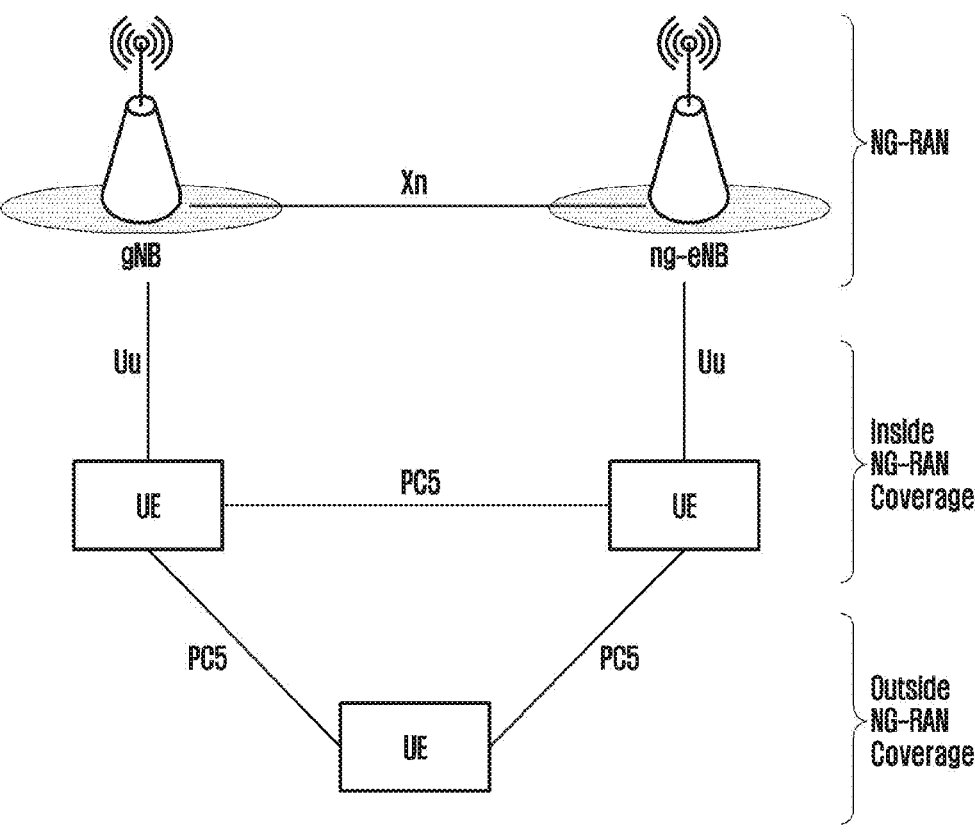
FIG. 1 shows an NG-RAN architecture supporting PC5 interface.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame})+x-\text{Monitoring-offset-PDCCH-slot}) \bmod (\text{Monitoring-periodicity-PDCCH-slot})=0;$$ [Equation 1]

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of a SCell, the DL BWP and UL BWP indicated by firstActiveDownlinkBWP-Id and firstActiveU-plinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported.

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource (s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous reception (DRX) may be configured by upper layers. The UE monitors short Messages transmitted with P-RNTI over DCI; monitors a Paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using fulll-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

4G and 5G wireless communication system supports vehicular communication services. Vehicular communication services, represented by V2X (vehicle to everything) services, can consist of the following four different types: V2V (vehicle to everything), V2I (vehicle to infrastructure), V2N (vehicle to network) and V2P (vehicle to pedestrian). In fifth generation (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics.

3) Advanced Driving enables semi-automated or full-automated driving. Each vehicle and/or RSU (road side unit) shares its own perception data obtained from its local sensors with vehicles in proximity and that allows vehicles to synchronize and coordinate their trajectories or manoeuvres. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

FIG. 1 shows an NG-RAN architecture supporting PC5 interface.

V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by radio access network (RAN) and when the UE is outside of RAN coverage. Only the UEs authorized to be used for V2X services can perform NR or V2X sidelink communication. The NG-RAN architecture supports the PC5 interface as illustrated in FIG. 1. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. Unicast transmission, characterized by support of at least one PC5-RRC connection between peer UEs; Transmission and reception of control information and user traffic between peer UEs in sidelink; Support of sidelink HARQ feedback; Support of RLC (radio link control) AM (acknowledged mode); and Support of sidelink RLM (radio link monitoring) for both peer UEs to detect RLF (radio link failure). Groupcast transmission, characterized by: Transmission and reception of user traffic among UEs belonging to a group in sidelink; Support of sidelink HARQ feedback. Broadcast transmission, characterized by: Transmission and reception of user traffic among UEs in sidelink.

The AS protocol stack for the control plane in the PC5 interface consists of RRC (radio resource control), PDCP (packet data convergence protocol), RLC (radio link control) and MAC (medium access control) sublayer, and the physical layer. The AS protocol stack for user plane in the PC5 interface consists of SDAP (service data adaption protocol), PDCP, RLC and MAC sublayer, and the physical layer. Sidelink Radio bearers (SLRB) are categorized into two groups: sidelink data radio bearers (SL DRB) for user plane data and sidelink signalling radio bearers (SL SRB) for control plane data. Separate SL SRBs using different SCCHs are configured for PC5-RRC and PC5-S signaling respectively.

The MAC sublayer provides the following services and functions over the PC5 interface:—Radio resource selection; Packet filtering; Priority handling between uplink and sidelink transmissions for a given UE; Sidelink CSI reporting. With LCP restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a SL-SCH MAC header including portions of both Source Layer-2 ID and a Destination Layer-2 ID is added to each MAC PDU as specified in subclause 8.x. LCID included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;

STCH can be mapped to SL-SCH;

SBCCH can be mapped to SL-BCH.

The RRC sublayer provides the following services and functions over the PC5 interface:

Transfer of a PC5-RRC message between peer UEs;

Maintenance and release of a PC5-RRC connection between two UEs;

Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287.

There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation, characterized by:

The UE needs to be RRC CONNECTED in order to transmit data;

NG-RAN schedules transmission resources.

UE autonomous resource selection, characterized by:

The UE can transmit data when inside NG-RAN coverage, irrespective of which RRC state the UE is in, and when outside NG-RAN coverage;

The UE autonomously selects transmission resources from a pool of resources.

For NR sidelink communication, the UE performs sidelink transmissions only on a single carrier.

Scheduled Resource Allocation: NG-RAN can dynamically allocate resources to the UE via the SL-RNTI on PDCCH(s) for NR sidelink Communication. In addition, NG-RAN can allocate sidelink resources to UE with two types of configured sidelink grants:

With type 1, RRC directly provides the configured sidelink grant for NR sidelink communication With type 2, RRC provides the periodicity of the configured sidelink grant while PDCCH can either signal and activate the configured sidelink grant, or deactivate it.

The PDCCH provides the actual grant (i.e. resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

UE Autonomous Resource Allocation: The UE autonomously selects sidelink grant from a pool of resources provided by broadcast system information or dedicated signalling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g. reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signalling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

In 5G wireless communication system, the PDCCH monitoring activity of the UE in RRC CONNECTED mode is governed by discontinuous reception (DRX).

Figure 2:
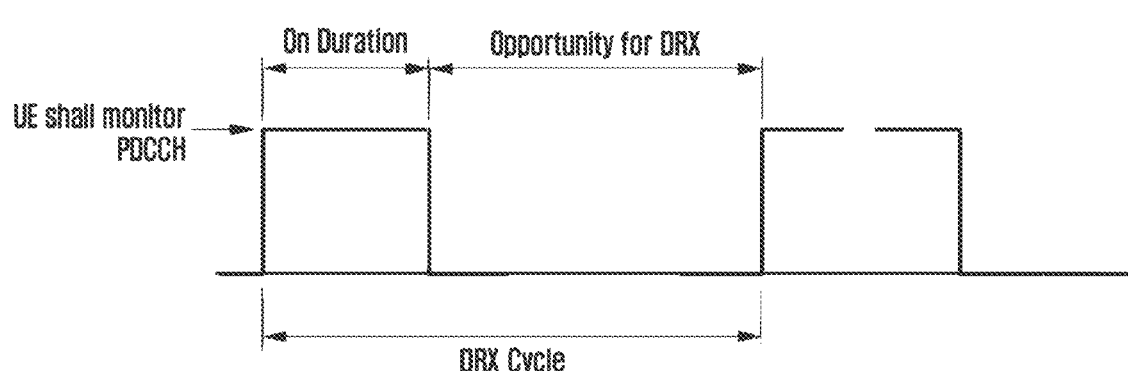
FIG. 2 shows an example of DRX cycle.

FIG. 2 shows an example of DRX cycle. When DRX is configured, the UE does not have to continuously monitor PDCCH. Referring to the FIG. 2, DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Active time includes the time while:

(1) On duration timer (e.g., drx-onDurationTimer) is running; or, inactivity timer (e.g., drx-InactivityTimer) is running; or (2) retransmission timer (e.g. drx-RetransmissionTimerDL or drx-RetransmissionTimerUL) is running; or (3) contention resolution timer (e.g., ra-ContentionResolutionTimer) is running, or msgB response window (e.g., msgB-Response Window) is running; or (4) PDCCH indicating a new transmission is not received upon completion of CFRA (contention free random access); or (5) a scheduling request (SR) is sent on PUCCH and is pending.

Similar to Uu DRX, DRX for SL communication is being studied to minimize UE power consumption during SL communication. Physical channels and signals for SL communication consists of PSCCH, PSSCH, PSFCH, S-PSS, S-SSS and PSBCH.

Physical Sidelink Control Channel (PSCCH) indicates resource and other transmission parameters used by a UE for PSSCH. PSCCH transmission is associated with a DM-RS.

Physical Sidelink Shared Channel (PSSCH) transmits the TBs of data themselves, and control information for HARQ procedures and CSI feedback triggers, etc. At least 6 OFDM symbols within a slot are used for PSSCH transmission. PSSCH transmission is associated with a DM-RS and may be associated with a PT-RS.

Physical Sidelink Feedback Channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The Sidelink synchronization signal consists of sidelink primary and sidelink secondary synchronization signals (S-PSS, S-SSS), each occupying 2 symbols and 127 subcarriers. Physical Sidelink Broadcast Channel (PSBCH) occupies 9 and 5 symbols for normal and extended cyclic prefix cases respectively, including the associated DM-RS.

DRX cycle, on duration, inactivity timer, retransmission timer will be defined as in Uu DRX. One of the issue for SL DRX is what constitutes the active time for SL DRX operation.

SL DRX Active Time

SL DRX may be configured to minimise power consumption during the SL communication.

Figure 3:
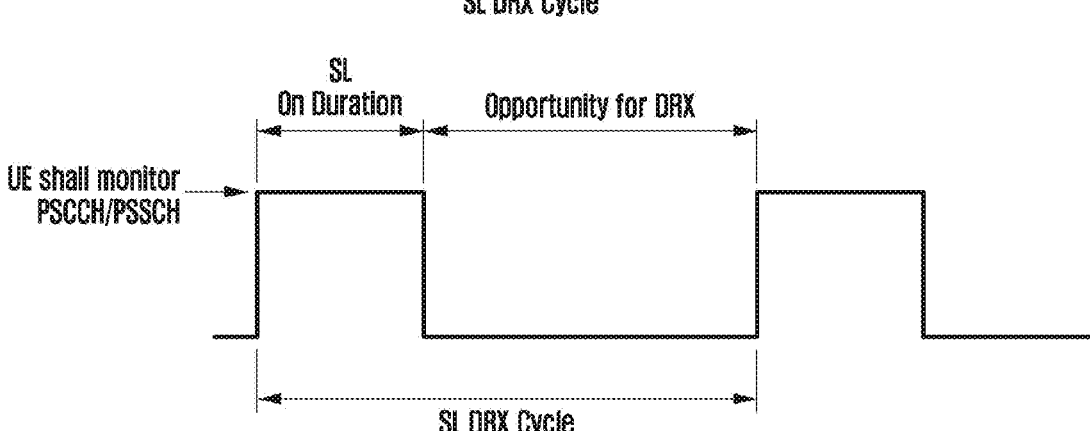
FIG. 3 shows an example of SL DRX cycle.

FIG. 3 shows an example of SL DRX cycle. SL DRX configuration comprise of sl-On-Duration, sl-DRX-Cycle-Length as shown in FIG. 3. It may also include sl-DRX-Inactivity-Timer and sl-DRX-Retransmission-Timer. For SL unicast communication, the SL DRX configuration is per unicast connection. In an embodiment, SL DRX configuration is per UE per unicast connection. The SL DRX configuration may be signaled by GNB in dedicated signaling or system information. For example, the dedicated signaling can be used when UE is in RRC Connected. The system information can be used when UE is in RRC IDLE or RRC INACTIVE. The SL DRX configuration may be pre-configured. For example, the pre-configuration can be used when UE is out of coverage. Each UE of a unicast connection may share its SL DRX configuration with peer UE using RRC signaling.

SL DRX active time may include the time while:
sl-On-Duration timer is running; or
sl-DRX-Inactivity-Timer is running; or
sl-DRX-Retransmission-Timer is running.

If SL DRX is configured, UE monitors PSCCH during the active time. In an embodiment, during the active time, UE monitors (i.e. receives) PSCCH and PSSCH.

Figure 4:
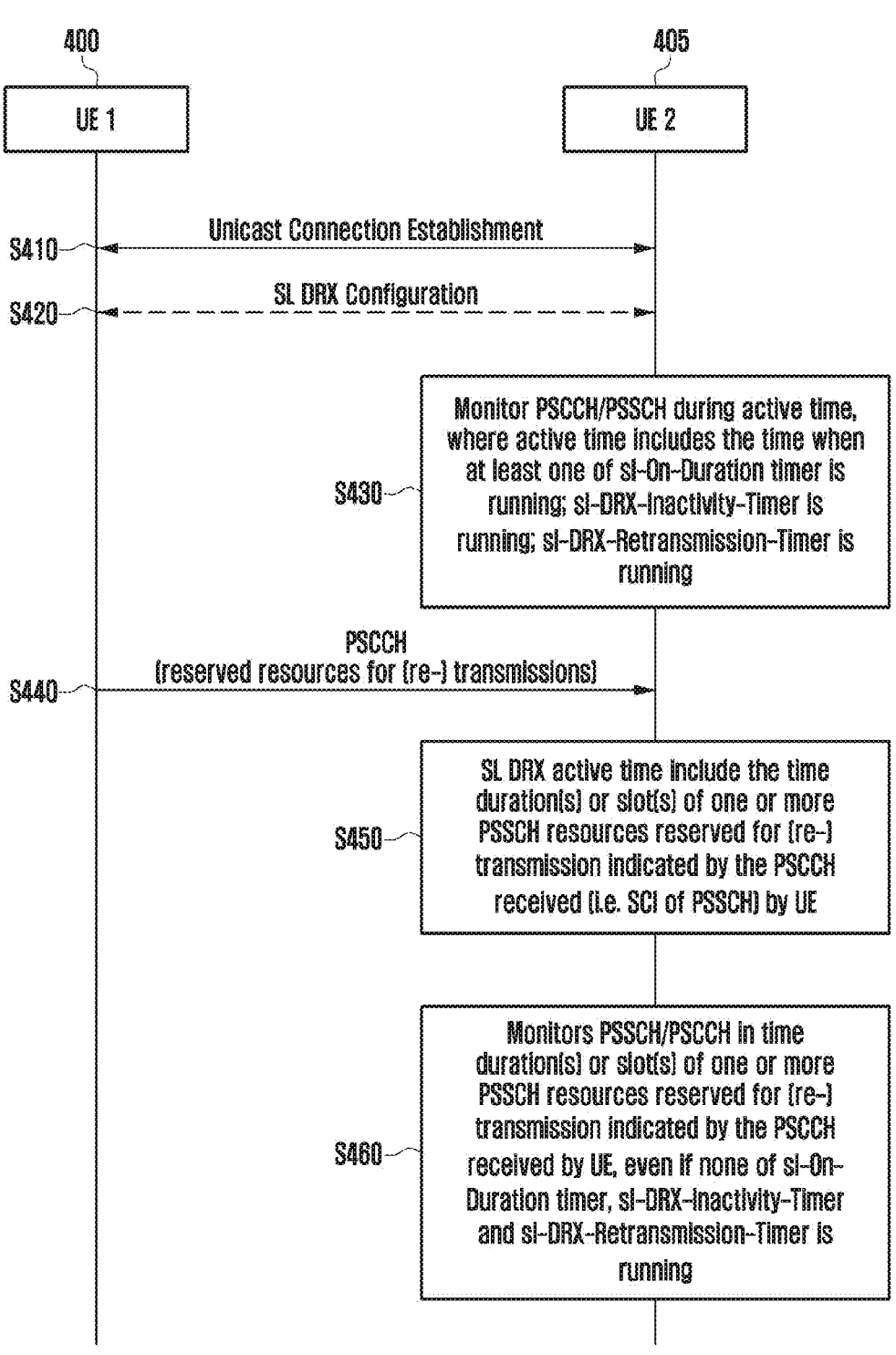
FIG. 4 illustrates an example of signaling flow for PSCCH/PSSCH monitoring during SL DRX operation based on information in received PSCCH.

PSCCH/PSSCH Monitoring During SL DRX Operation Based on Information in Received PSCCH:

FIG. 4 illustrates an example of signaling flow for PSCCH/PSSCH monitoring during SL DRX operation based on information in received PSCCH.

Referring to FIG. 4, unicast connection may be established between UE 1 (400) and UE 2 (405) (S410). SL DRX for the unicast connection between UE 1 and UE 2 may be configured (S420). UE 2 may monitor PSCCH/PSSCH during active time where the active time includes the time when at least one of sl-On-Duration timer is running; sl-DRX-inactivity-Timer is running; or sl-DRX-Retransmission-Timer is running (S430). UE 2 may receive PSCCH from the UE 1 (S440). PSCCH may include resource information of PSSCH indicating time duration(s) or slot(s) of one or more PSSCH resources reserved for (re-) transmission.

UE 2 may identify SL DRX active time (S450). In an embodiment, SL DRX active time may include the time duration(s) or slot(s) of one or more PSSCH resources reserved for (re-) transmission indicated by the PSCCH received (i.e. SCI of PSSCH) by UE. UE 2 may monitor PSCCH/PSSCH in time duration(s) or slot(s) of one or more PSSCH resources reserved for (re-)transmission indicated by the PSCCH received from UE 1, even if none of sl-On-Duration timer; sl-DRX-inactivity-Timer; and sl-DRX-Retransmission-Timer is running (S460). This is illustrated for one of the UE (e.g., UE 2) of unicast connection in FIG. 4. Note that similar operation is also performed by UE1. Note that the time duration(s) or slot(s) of one or more PSSCH resources for HARQ retransmissions are included in active time only if UE has failed to receive the HARQ packet and needs to receive retransmission. In an embodiment, SL DRX active time may include the time duration or slot of first PSSCH resource reserved for (re-) transmission indicated by the PSCCH received (i.e. SCI of PSSCH) by UE. UE 2 may monitor PSCCH/PSSCH in time duration or slot of first PSSCH resource reserved for (re-) transmission indicated by the PSCCH received from UE 1, even if none of sl-On-Duration timer; sl-DRX-inactivity-Timer; and sl-DRX-Retransmission-Timer is running (S460).

Figure 5:
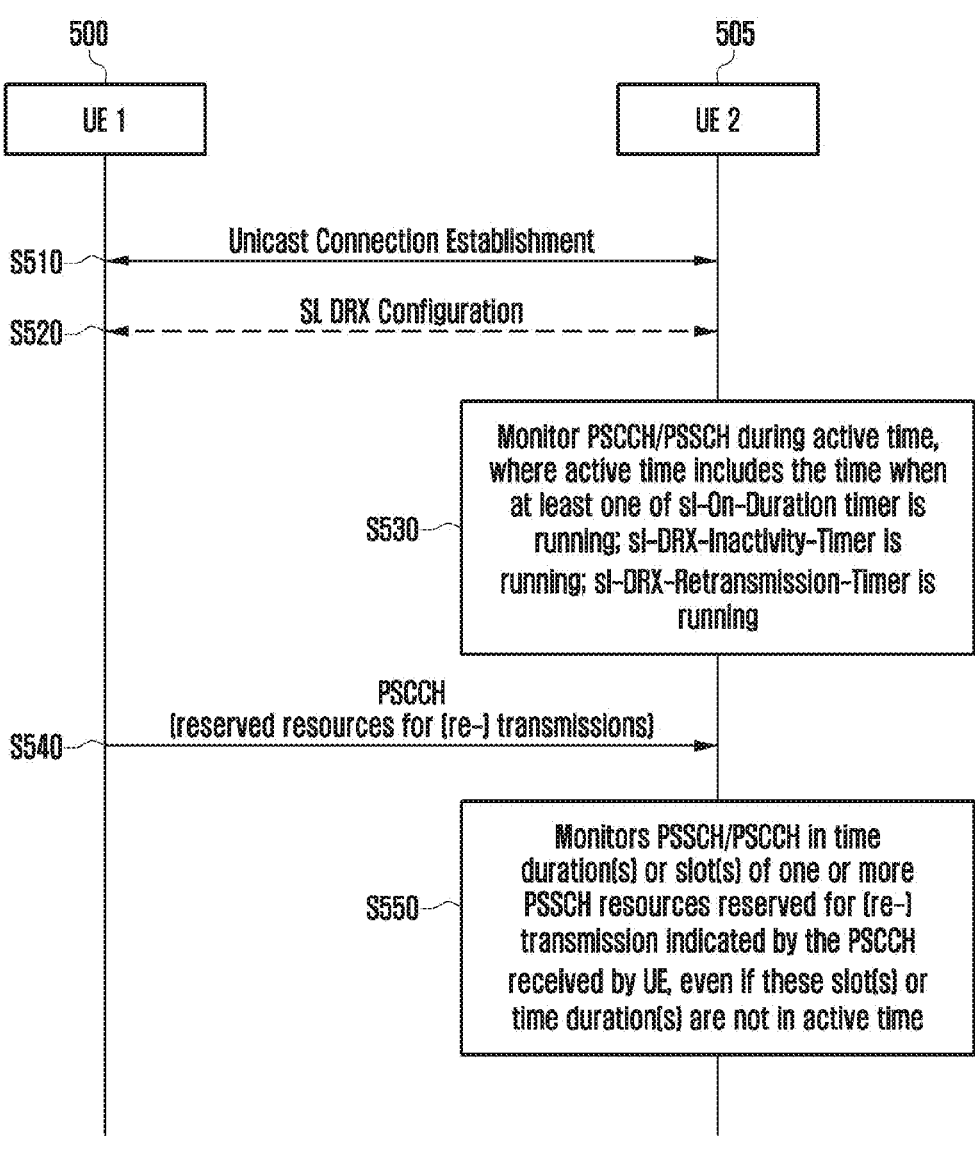
FIG. 5 illustrates an another example of signaling flow for PSCCH/PSSCH monitoring during SL DRX operation based on information in received PSCCH.

FIG. 5 illustrates an another example of signaling flow for PSCCH/PSSCH monitoring during SL DRX operation based on information in received PSCCH.

Referring to FIG. 5, unicast connection may be established between UE 1 (500) and UE 2 (505) (S510). SL DRX for the unicast connection between UE 1 and UE 2 may be configured (S520). UE 2 may monitor PSCCH/PSSCH during active time where the active time includes the time when at least one of sl-On-Duration timer is running; sl-DRX-inactivity-Timer is running; or sl-DRX-Retransmission-Timer is running (S530). UE 2 may receive PSCCH from the UE 1 (S540). PSCCH may include resource information of PSSCH indicating time duration(s) or slot(s) of one or more PSSCH resources reserved for (re-) transmission.

UE 2 may monitor PSSCH/PSCCH in time duration(s) or slot(s) of one or more PSSCH resources reserved for (re-) transmission indicated by the PSCCH received by UE 2, even if these slot(s) or time duration(s) are not in active time (S550). This is illustrated for one of the UE (e.g., UE 2) of unicast connection in FIG. 5. Note that similar operation is also performed by UE1. Note that the time duration(s) or slot(s) of one or more PSSCH resources for HARQ retransmissions are monitored only if UE has failed to receive the HARQ packet and needs to receive retransmission.

PSCCH/PSSCH Monitoring During SL DRX Operation Based on SL CG Configuration:

In SL communication, GNB may assign periodically occurring SL configured grants (CGs) to UEs for SL transmission.

There are two types of SL configured grants:

configured grant Type 1 where an sidelink grant is provided by RRC, and stored as configured sidelink grant;

configured grant Type 2 where an sidelink grant is provided by PDCCH, and stored or cleared as configured sidelink grant based on L1 signalling indicating configured sidelink grant activation or deactivation.

Figure 6:
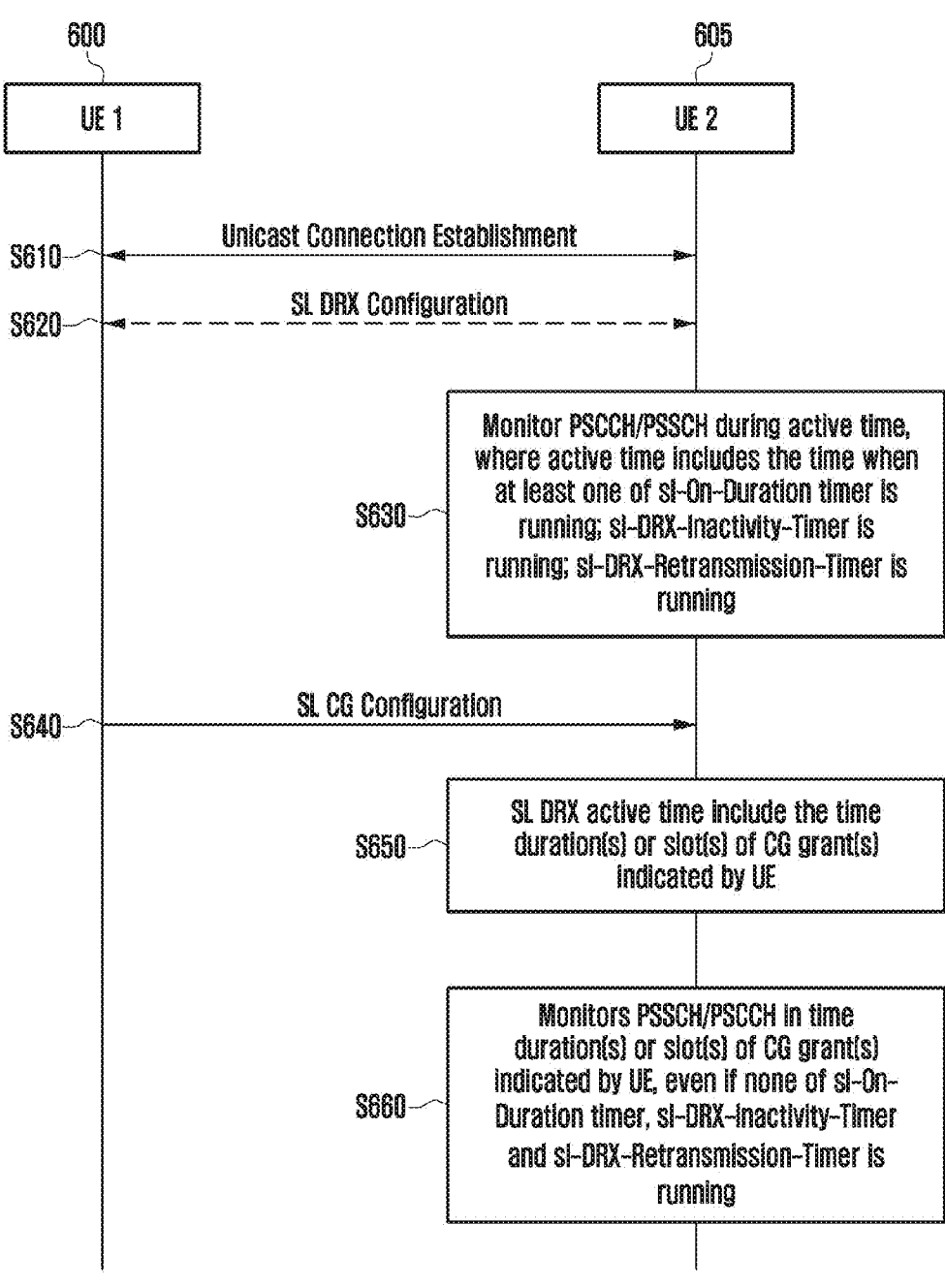
FIG. 6 illustrates an example of signaling flow for PSCCH/PSSCH monitoring during SL DRX operation based on SL CG configuration.

FIG. 6 illustrates an example of signaling flow for PSCCH/PSSCH monitoring during SL DRX operation based on SL CG configuration.

In an embodiment, unicast connection may be established between UE 1 (600) and UE 2 (605) (S610). SL DRX for the unicast connection between UE 1 and UE 2 may be configured (S620). UE 2 may monitor PSCCH/PSSCH during active time where the active time includes the time when at least one of sl-On-Duration timer is running; sl-DRX-inactivity-Timer is running; or sl-DRX-Retransmission-Timer is running (S630). UE (e.g. UE 1) may send information (e.g. time slot(s) and/or frequency resource info, etc. as explained later) about the SL CGs to peer UE (e.g. UE 2) (S640).

UE 2 may identify SL DRX active time (S650). In an embodiment, SL DRX active time may include the time duration(s) or slot(s) of these SL configured grants indicated by UE 1. UE 2 may monitor PSSCH/PSCCH in time duration(s) or slot(s) of CG grant(s) indicated by the UE 1, even if none of sl-On-Duration timer; sl-DRX-inactivity-Timer; and sl-DRX-Retransmission-Timer is running (S660). This is illustrated for one of the UE (UE 2) of unicast connection in FIG. 6. Note that similar operation is also performed by UE1.

Figure 7:
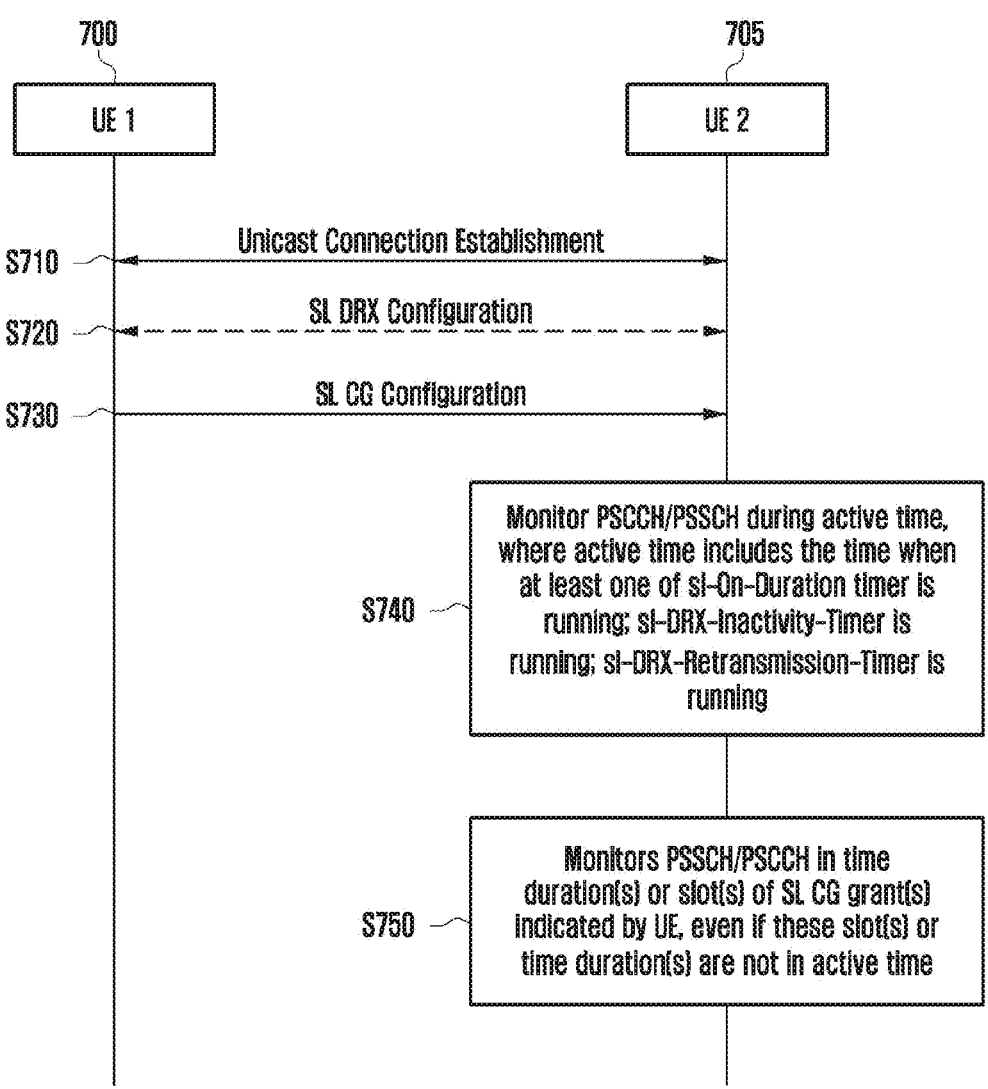
FIG. 7 illustrates an another example of signaling flow for PSCCH/PSSCH monitoring during SL DRX operation based on SL CG configuration.

FIG. 7 illustrates an another example of signaling flow for PSCCH/PSSCH monitoring during SL DRX operation based on SL CG configuration.

In an alternate embodiment, referring to FIG. 7, unicast connection may be established between UE 1 (700) and UE 2 (705) (S710). SL DRX for the unicast connection between UE 1 and UE 2 may be configured (S720). UE (e.g. UE 1) may send information (e.g. time slot(s) and/or frequency resource info, etc. as explained later) about the SL CGs to peer UE (e.g. UE 2) (S730). UE 2 may monitor PSCCH/PSSCH during active time where the active time includes the time when at least one of sl-On-Duration timer is running; sl-DRX-inactivity-Timer is running; or sl-DRX-Retransmission-Timer is running (S740). UE may monitor PSSCH/PSCCH in time duration(s) or slot(s) of these SL configured grants, even if these slot(s) or time duration(s) are not in active time (S750). This is illustrated for one of the UE (UE 2) of unicast connection in FIG. 7. Note that similar operation is also performed by UE1.

For configured grant type 1, following parameters are signaled by gNB to UE 1. UE 1 may send one or more of these parameters to UE2.

sl-ConfigIndexCG: the identifier of a configured grant for sidelink;

sl-CS-RNTI: SLCS-RNTI for retransmission;

sl-NrOfHARQ-Processes: the number of HARQ processes for configured grant;

sl-PeriodCG: periodicity of the configured grant Type 1;

sl-TimeOffsetCG-Type1: Offset of a resource with respect to SFN=sl-TimeReferenceSFN-Type1 in time domain, referring to the number of logical slots that can be used for SL transmission;

sl-TimeResourceCG-Type1: time resource location of the configured grant Type 1;

sl-CG-MaxTransNumList: the maximum number of times that a TB can be transmitted using the configured grant;

sl-HARQ-ProcID-offset: offset of HARQ process for configured grant Type 1;

sl-TimeReferenceSFN-Type1: SFN used for determination of the offset of a resource in time domain. The UE uses the closest SFN with the indicated number preceding the reception of the sidelink configured grant configuration Type 1.

For configured grant type 2, following parameters are signaled by gNB to UE 1. UE 1 may send one or more of thease parameters to UE2.

sl-ConfigIndexCG: the identifier of a configured grant for sidelink;

sl-CS-RNTI: SLCS-RNTI for activation, deactivation, and retransmission;

sl-NrOfHARQ-Processes: the number of HARQ processes for configured grant;

sl-PeriodCG: periodicity of the configured grant Type 2;

sl-CG-MaxTransNumList: the maximum number of times that a TB can be transmitted using the configured grant;

sl-HARQ-ProcID-offset: offset of HARQ process for configured grant Type 2.

For configured grant Type 1, UE shall consider sequentially that the first slot of the $S^{th}$ sidelink grant occurs in the logical slot for which:

$$[(SFN \times numberOfSLSlotsPerFrame) + \text{logical slot number in the frame}] =$$
$$(sl\text{-}TimeReferenceSFN\text{-}Type1 \times numberOfSLSlotsPerFrame + sl\text{-}$$
$$TimeOffsetCGType1 + S \times PeriodicitySL)$$
$$modulo(1024 \times numberOfSLSlotsPerFrame).$$

$$\text{where Periodicity} = \left\lceil \frac{N}{20 \text{ ms}} \times sl\_periodCG \right\rceil,$$

numberOfSLSlotsPerFrame refers to the number of logical slots that can be used for SL transmsission in the frame and N refer to the number of slots that can be used for SL transmsission within 20 ms, if configured, of TDD-UL-DL-ConfigCommon.

For a configured grant Type 2, the UE shall consider sequentially that the first slot of $S^{th}$ sidelink grant occurs in the logical slot for which:

[(SFN×numberOfSLSlotsPerFrame)+logical slot number in the frame]=[(SFN$_{start\ time}$×numberOfSLSlotsPerFrame+slot$_{start\ time}$)+S×PeriodicitySL]modulo (1024×numberOfSLSlotsPerFrame).

where SFN$_{start\ time}$ and slot$_{start\ time}$ are the SFN and logical slot, respectively, of the first transmission opportunity of PSSCH where the configured sidelink grant was (re-)initialised by PDCCH.

SL CSI Reporting Procedure for SL Communication.

SL CSI reporting procedure for SL communication may be as follows:

Unicast connection is established between UE 1 and UE 2.

UE 1 sends CSI request to UE 2. CSI Request is included in in stage 2 SCI. Stage 2 SCI is transmitted on PSSCH.

UE 2 upon receiving CSI request starts a timer (e.g., sl-CSI-ReportTimer).

In an embodiment, the value of the timer (e.g., sl-CSI-ReportTimer) is the same as the latency requirement of the SL-CSI reporting indicated by sl-Laten-cy-BoundCSI-Report configured by RRC, sl-Latency-BoundCSI-Report value is sent by UE 1 to UE2 using RRC signaling or it can be signaled by gNB to UE1 and/or UE2).

If UE2 obtains the SL grant while the timer is running:

UE 2 generates SL MAC PDU carrying CSI report MAC CE, and

UE 2 transmit SCI 1(i.e. $1^{st}$ stage SCI) in PSCCH resource, transmits SCI 2 (i.e., $2^{nd}$ stage SCI) in PSSCH resource and SL MAC PDU in PSSCH resource.

Figure 8:
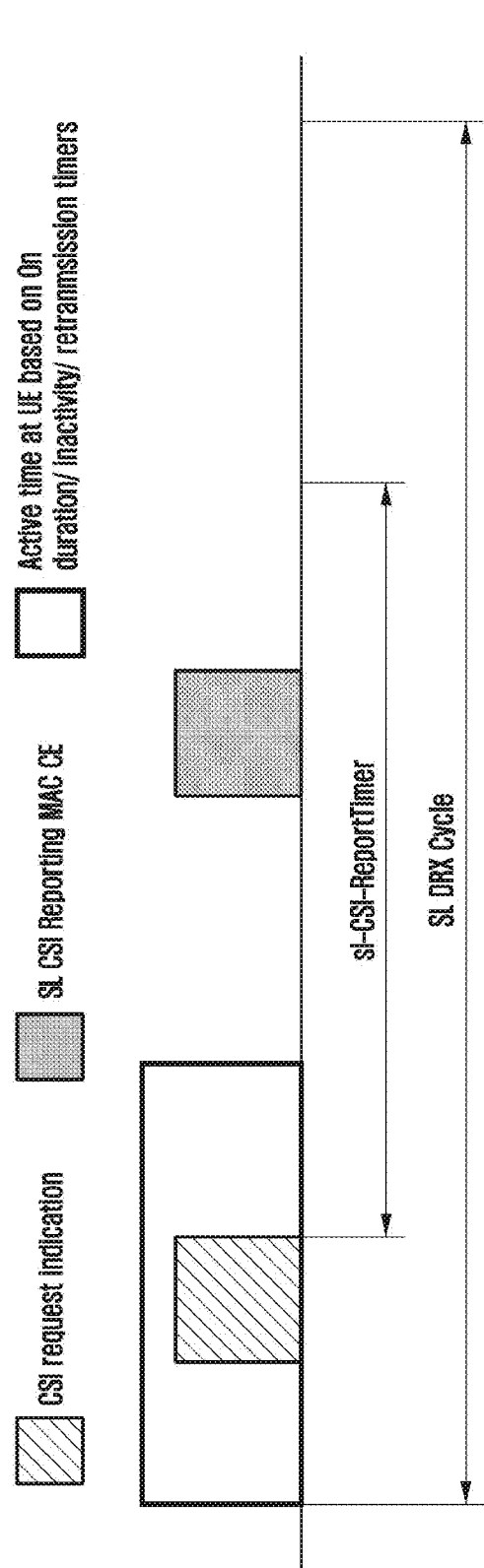
FIG. 8 is an example operation at UE which has requested SL CSI report from peer UE.

FIG. 8 is an example operation at UE which has requested SL CSI report from peer UE. As can be seen from FIG. 8, UE may miss to receive SL CSI report when SL DRX is configured. For example, UE 2 may transmit the SL CSI report in a time while the timer (e.g., sl-CSI-ReportTimer) is running. However, UE 1 may miss the SL CSI report from the UE 2 if the SL CSI report is transmitted outside on duration of SL DRX cycle (or outside active time of SL DRX).

Figure 9:
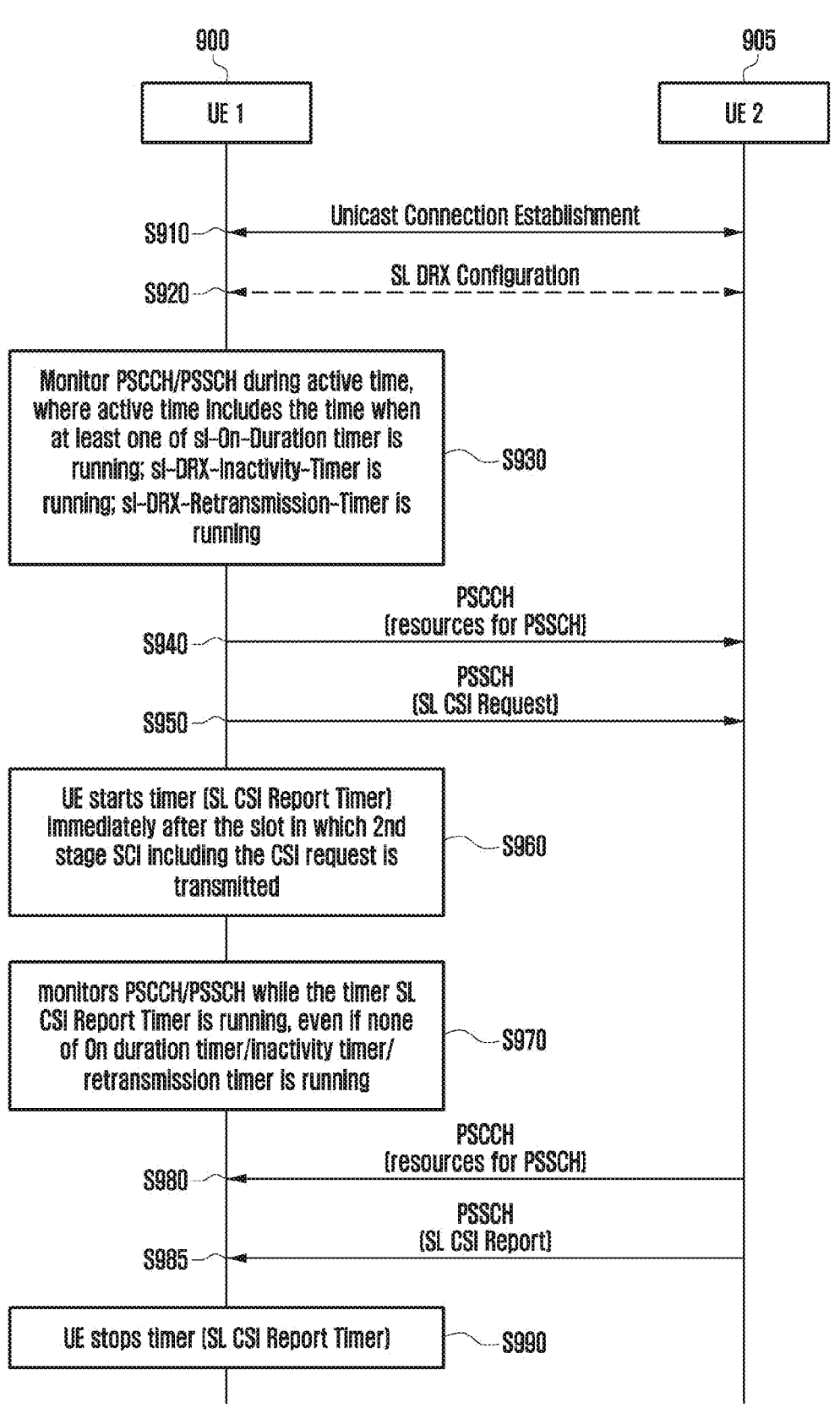
FIG. 9 illustrates an example of signaling flow to avoid missing the SL CSI report according to an embodiment of the disclosure.

FIG. 9 illustrates an example of signaling flow to avoid missing the SL CSI report according to an embodiment of the disclosure.

In order to avoid missing the SL CSI report, in one embodiment of this disclosure, UE operation (FIG. 9) may be as follows:

Unicast connection may be established between UE 1 (900) and UE 2 (905) (S910).

SL DRX for the unicast connection between UE 1 and UE 2 may be configured (S920). For example, each UE may obtain parameters associated with DRX.

UE 1 may monitor PSCCH/PSSCH during an active time of SL DRX (S930). For example, the active time may include a time while at least one of sl-On-Duration timer is running; sl-DRX-Inactive-Timer is running; or sl-DRX-retransmission-Timer is running.

UE 1 may transmit PSCCH to UE 2 (S940). PSCCH may include information on resources for PSSCH.

UE 1 may transmit PSSCH to UE 2 (S950) based on the information on resources for PSSCH. UE 1 may send a CSI request to UE 2. The CSI Request may be included in stage 2 (i.e. 2nd stage) SCI. Stage 2 SCI may be transmitted on PSSCH. Stage 2 SCI may indicate one or more slot(s) or time duration(s)(time resource(s)) for a SL CSI report.

UE 1 may start a timer (e.g., SL CSI Report Timer) immediately after the slot in which $2^{nd}$ stage SCI including the CSI request is transmitted by it (S960).

Note that in conventional procedure, SL CSI Report Timer is started by UE (e.g. UE 2) which has received the CSI request, when it receives CSI request from peer UE (i.e. UE 1).

In an embodiment, the value of sl-CSI-ReportTimer (i.e., SL CSI Report Timer) is the same as the latency requirement of the SL-CSI reporting in sl-La-tency-BoundCSI-Report configured by RRC, sl-Latency- BoundCSI-Report value is sent by UE 1 to UE2 using RRC signaling or it can be signaled by gNB to UE1 and/or UE2

The timer started by the UE 1 (e.g., SL CSI Report Timer) may be re-started if stage 2 SCI is retransmitted by it.

The timer started by the UE 1 (e.g., SL CSI Report Timer) may be stopped upon receiving SL CSI report MAC CE.

In an embodiment, UE 2 reporting CSI report may include indication in stage 2 SCI to indicate that PSSCH includes CSI reporting MAC CE. Based on this indication in SCI, UE 1 may stop the timer (e.g., SL CSI Report Timer).

UE 1 may monitor PSCCH/PSSCH while the timer (e.g., SL CSI Report Timer) is running, even if none of On duration timer/inactivity timer/retransmission timer is running (S970).

In an embodiment, active time for SL DRX operation may include the time while

On duration timer is running; inactivity timer is running; or retransmission timer is running; or the timer (e.g., SL CSI Report Timer) is running In an embodiment, to avoid delays in receiving the CSI report from peer UE (i.e. UE 2), the time from slot 'N+1' to 'N+X' may be considered as active time. In other words, UE 1 should continue receiving SCI from peer UE (i.e. UE 2) during this time interval even when neither on duration timer nor inactivity timer is running.

N=slot in which SCI including CSI request is transmitted by UE 1

X=number of slots given by a parameter associated with the timer (e.g., SL CSI Report Timer)

For example, the value of the timer (e.g., sl-CSI-ReportTimer(i.e., SL CSI Report Timer)) is the same as the latency requirement of the SL-CSI reporting in sl-LatencyBoundCSI-Report configured by RRC, sl-LatencyBoundCSl-Report value is sent by UE 1 to UE2 using RRC signaling or it can be signaled by gNB to UE1 and/or UE2.

In an alternative embodiment, to avoid delays in receiving the CSI report by UE 1, the time while the timer (e.g., SL CSI Report Timer) is running may be considered as active time. The timer (e.g., SL CSI Report Timer) is started from end of slot in which SCI including CSI request is transmitted by UE 1.

The parameter associated with the timer (e.g., SL CSI Report Timer) may be configured by gNB or may be pre-configured.

In an embodiment, to avoid delays in receiving the CSI report from peer UE, UE may start a timer (e.g., sl-DRX-Inactivity-Timer) immediately after the slot in which $2^{nd}$ stage SCI including the CSI request is transmitted In another embodiment, a new timer other than SL CSI Report Timer may be used in above operation where the time is configured in SL configuration (pre-configured or signaled by gNB)

UE 2 may transmit PSCCH including information on resources for PSSCH (S980).

UE 2 upon receiving CSI request may generate SL MAC PDU carrying SL CSI report MAC CE and transmit to UE 1 (S985). SL CSI report MAC CE is transmitted on PSSCH.

UE 1 receiving SL CSI report MAC CE may stop the timer (e.g., SL CSI Report Timer) (S990).

In an embodiment, UE 1 may stop the timer (e.g., SL CSI Report Timer) based on the indication in stage 2 SCI indicating that PSSCH transmitted by UE 2 includes SL CSI report MAC CE.

In order to avoid missing the SL CSI report, in an alternate embodiment of this disclosure, UE operation may be as follows:

Unicast connection may be established between UE 1 and UE 2.

SL DRX for the unicast connection between UE 1 and UE 2 may be configured.

For example, each UE may obtain parameters associated with DRX.

UE 1 may send a CSI request to UE 2. CSI Request may be included in stage 2 SCI. Stage 2 SCI may be transmitted on PSSCH.

Stage 2 SCI may indicate one or more slot(s) or time duration(s)(or time resource(s)) for CSI report UE 1 may monitor PSCCH/PSSCH in the slots or time duration(s)(or time resource(s)) indicated for CSI report, even if none of On duration timer/inactivity timer/retransmission timer is running In an embodiment, active time for SL DRX operation includes the time while:

On duration timer is running; inactivity timer is running; or retransmission timer is running; or One or more slots or time duration(s)(or time resource (s)) for CSI report.

UE 2 upon receiving CSI request may generate SL MAC PDU carrying CSI report MAC CE and transmit to UE1. CSI report MAC CE may be transmitted on PSSCH.

SL DRX Operation and PSFCH/S-PSS/S-SSS/PSBCH Reception

Figure 10:
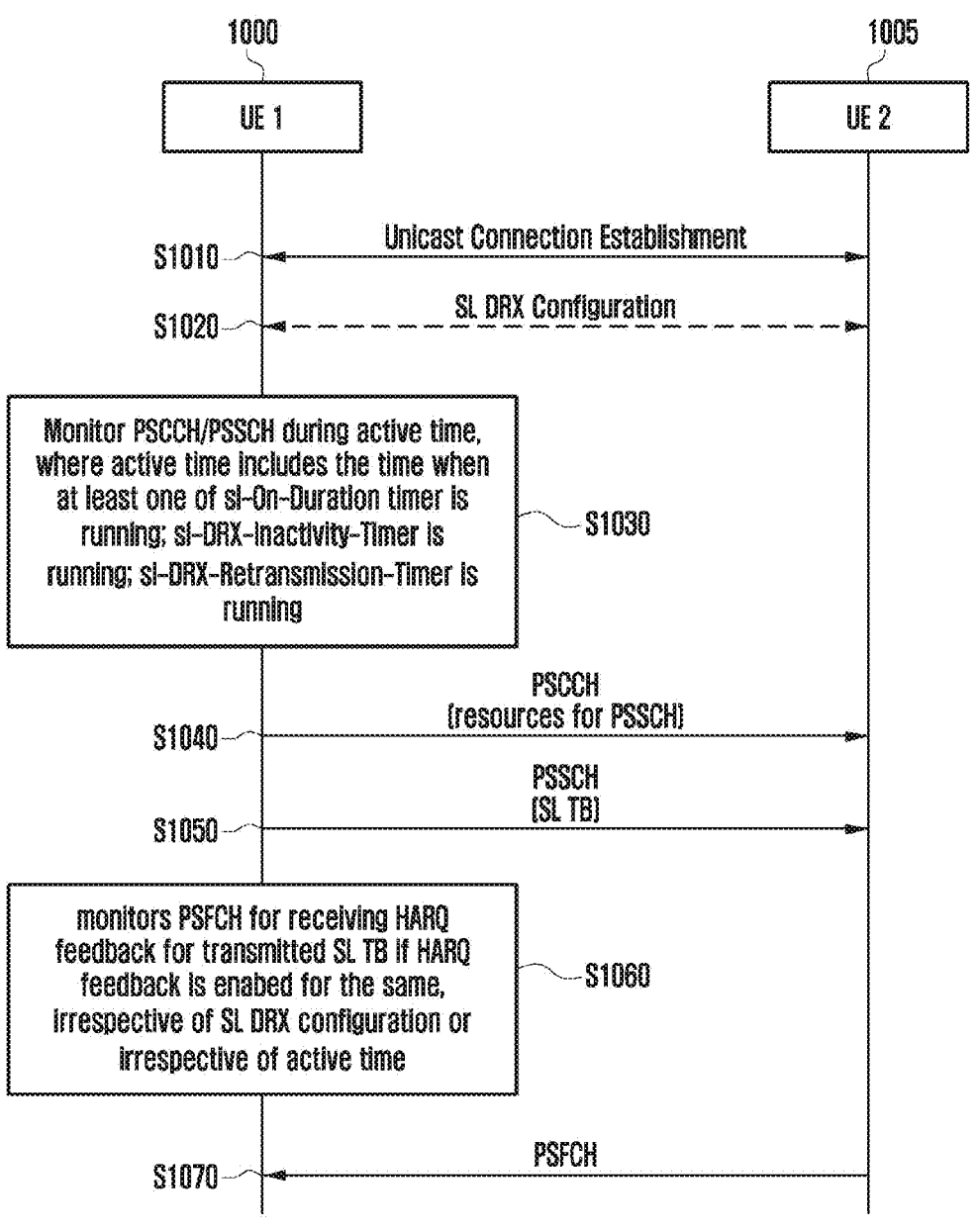
FIG. 10 illustrates an example of signaling flow for SL DRX operation and PSFCH/S-PSS/S-SSS/PSBCH reception according to an embodiment of the disclosure.

FIG. 10 illustrates an example of signaling flow for SL DRX operation and PSFCH reception according to an embodiment of the disclosure.

Referring to the FIG. 10, unicast connection may be established between UE 1 (1000) and UE 2 (1005) (S1010). SL DRX for the unicast connection between UE 1 and UE 2 may be configured (S1020). UE 1 may monitor PSCCH/PSSCH during an active time of SL DRX (S1030). For example, the active time of the SL DRX may include a time while at least one of sl-On-Duration timer is running; sl-DRX-Inactive-Timer is running; or sl-DRX-retransmission-Timer is running. UE 1 may transmit PSCCH to UE 2 (S1040). PSCCH may include information on resources for PSSCH. UE 1 may transmit a transport block (TB) on PSSCH to UE 2 (S1050). Upon transmitting the TB on PSSCH resource, UE 1 may monitor PSFCH for HARQ feedback if the HARQ feedback is enabled for transmitted TB (S1060).

In case of SL DRX operation, PSFCH slot(s) may occur outside the active time. In this case UE (e.g., UE 1) may miss receiving HARQ feedback. In order to avoid missing HARQ feedback reception, the following methods may be considered.

In one embodiment, UE (e.g. UE 1) may monitor PSFCH irrespective of whether UE is in active time or not as illustrated in FIG. 10. In one embodiment, the one or more slots in which UE expects HARQ feedback for transmitted TB, may be considered as belonging to active time. UE may receive PSFCH for HARQ feedback (S1070). From perspective of UE (e.g., UE 2) transmitting PSFCH, in an embodiment, UE may transmit HARQ feedback on PSFCH irrespective of whether the slot in which HARQ feedback needs to transmitted is in active time or not of peer UE (e.g. UE 1).

Although the example of FIG. 10 is mainly described with reference to the PSFCH, but it is not limited thereto, and may be extended and applied to S-PSS/S-SSS/PSBCH and the like. In one embodiment, when SL DRX is configured, UE monitors S-PSS, S-SSS and PSBCH irrespective of whether UE is in active time or not. In one embodiment, when SL DRX is configured, one or more symbols/slots in which UE expects S-PSS, S-SSS and PSBCH may be considered as belonging to active time of SL DRX.

SL DRX Operation and Handling SL HARQ Round Trip Time (RTT) Timer and SL Re-Transmission Timer UE receives $1^{st}$ stage SCI and $2^{nd}$ stage SCI. $1^{st}$ stage SCI includes "Time resource assignment" which carries logical slot offset indication of N=1 or 2 actual resources when sl-MaxNumPerReserve is 2, and N=1 or 2 or 3 actual resources when sl_MaxNumPerReserve is 3. Stage 2 (i.e., $2^{nd}$ stage) SCI indicates whether HARQ is enabled or not for the scheduled TB. sl-MaxNumPerReserve is signaled by RRC signaling.

If $1^{st}$ stage SCI indicates that N equals to 1, and $2^{nd}$ stage SCI indicates that HARQ feedback is not enabled
    if UE fails to decode the scheduled TB (HARQ packet)
      start SL retransmission timer from end of slot in which TB was scheduled (i.e. slot in which SCI is received).
      Alternatively, start SL retransmission timer from end of 'slot in which TB was scheduled (i.e. slot in which SCI is received)+PSCCH/PSSCH processing time in slots'. PSCCH/PSSCH processing time may be pre-defined or signaled by gNB in RRC signaling. For example, if SCI was received in slot 5 and processing time is 2 slot, SL retransmission timer is started from slot 8.
      Alternatively, start SL retransmission timer from end of 'slot in which TB was scheduled (i.e. slot in which SCI is received)+X slots'. Value of X may be pre-defined or signaled by gNB in RRC signaling. For example, if SCI was received in slot 5 and X is 2 slot, SL retransmission timer is started from slot 8.
If $1^{st}$ stage SCI indicates that N equals to 1, and $2^{nd}$ stage SCI indicates that HARQ feedback is enabled
    if UE fails to decode the scheduled TB (HARQ packet)
      start SL HARQ RTT timer from end of slot in which HARQ feedback is transmitted
      start SL retransmission timer upon expiry of SL HARQ RTT timer
If $1^{st}$ stage SCI indicates that N>1
    if UE fails to decode the scheduled TB (HARQ packet)
      consider the slot in $2^{nd}$ resource is scheduled as active time where slot for $2^{nd}$ resource is indicated by received $1^{st}$ stage SCI FIG. 11 is a diagram illustrating the structure of a UE according to an embodiment of the disclosure.

Figure 11:
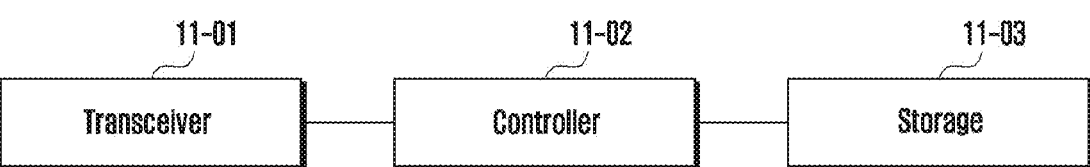
FIG. 11 is a diagram illustrating the structure of a UE according to an embodiment of the disclosure.

Referring to FIG. 11, the UE may include a transceiver 11-01, a UE controller 11-02, and a storage unit 11-03. In the disclosure, the UE controller 11-02 may be defined as a circuit or application-specific integrated circuit or at least one processor.

The transceiver 11-01 may transmit and receive signals to and from another network entity. For example, the transceiver 11-01 may receive dedicated RRC signaling being broadcasted from a base station according to an embodiment of the disclosure. For example, the transceiver 11-01 may transmit a CSI request to a peer UE and receive sidelink CSI report from the peer UE according to an embodiment of the disclosure. Alternatively, the transceiver 11-01 may receive a CSI request from a peer UE and transmit sidelink CSI report to the peer UE according to an embodiment of the disclosure.

The UE controller 11-02 may control the overall operation of the UE according to an embodiment proposed in the disclosure. For example, the UE controller 11-02 may control signal flow between respective blocks so as to perform an operation according to the above-described drawings and flowcharts. Specifically, the UE controller 11-02 may control the transceiver 11-01 to transmit a sidelink CSI request to the peer UE and to receive the sidelink CSI report in response to the sidelink CSI request from the peer UE.

The storage unit 11-03 may store at least one of information being transmitted and received through the transceiver 11-01 and information being generated through the UE controller 11-02. In an embodiment, the storage unit comprises one or more memories.

Figure 12:
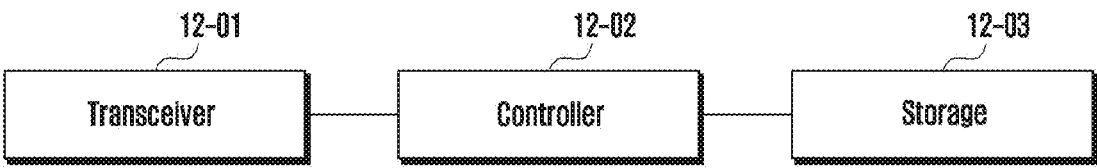
FIG. 12 is a diagram illustrating the structure of a base station according to an embodiment of the disclosure.

FIG. 12 is a diagram illustrating the structure of a base station according to an embodiment of the disclosure.

Referring to FIG. 12, the base station may include a transceiver 12-01, a base station controller 12-02, and a storage unit 12-03. In the disclosure, the base station controller 12-02 may be defined as a circuit or application-specific integrated circuit or at least one processor.

The transceiver 12-01 may transmit and receive signals to and from another network entity. For example, the transceiver 12-01 may broadcast SIB according to an embodiment of the disclosure.

The base station controller 12-02 may control the overall operation of the base station according to an embodiment proposed in the disclosure. For example, the base station controller 12-02 may control to configure parameters associated with DRX.

The storage unit 12-03 may store at least one of information being transmitted and received through the transceiver 12-01 and information being generated through the base station controller 12-02. In an embodiment, the storage unit comprises one or more memories.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Meanwhile, although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

The invention claimed is:

1. A method performed by a first user equipment (UE) in a wireless communication system, the method comprising:
    obtaining parameters associated with a sidelink discontinuous reception (DRX) for the first UE;
    transmitting, to a second UE, 2nd stage sidelink control information (SCI) on a physical sidelink shared channel (PSSCH), the 2nd stage SCI including a channel state information (CSI) request; and monitoring a sidelink channel in an active time of the sidelink DRX, wherein the active time of the sidelink DRX includes a period of a sidelink CSI report-related timer associated with the CSI request, in case that a sidelink CSI report is not received from the second UE, and wherein the period of the sidelink CSI report-related timer is indicated by a number of slots.

2. The method of claim 1, wherein the active time of the sidelink DRX includes a time duration between transmitting the CSI request and receiving the sidelink CSI report, in case that the sidelink CSI report is received from the second UE.

3. The method of claim 1, further comprising receiving, from the second UE, 1st stage SCI on a physical sidelink control channel (PSCCH), the 1st stage SCI including resource information for a periodic sidelink transmission by the second UE.

4. The method of claim 3, wherein the active time of the sidelink DRX includes one or more slots associated with the periodic sidelink transmission by the second UE.

5. A first user equipment (UE) in a wireless communication system, the first UE comprising:

a transceiver; and a controller functionally connected to the transceiver, wherein the controller is configured to:

obtain parameters associated with a sidelink discontinuous reception (DRX) for the first UE;

transmit, to a second UE, via the transceiver, 2nd stage sidelink control information (SCI) on a physical sidelink shared channel (PSSCH), the 2nd stage SCI including a channel state information (CSI) request; and monitor a sidelink channel in an active time of the sidelink DRX, wherein the active time of the sidelink DRX includes a period of a sidelink CSI report-related timer associated with the CSI request, in case that a sidelink CSI report is not received from the second UE, and wherein the period of the sidelink CSI report-related timer is indicated by a number of slots.

6. The first UE of claim 5, wherein the active time of the sidelink DRX includes a time duration between transmitting the CSI request and receiving the sidelink CSI report, in case that the sidelink CSI report is received from the second UE.

7. The first UE of claim 5, wherein the controller is further configured to receive, from the second UE, via the transceiver, 1st stage SCI on a physical sidelink control channel (PSCCH), the 1st stage SCI including resource information for a periodic sidelink transmission by the second UE.

8. The first UE of claim 7, wherein the active time of the sidelink DRX includes one or more slots associated with the periodic sidelink transmission by the second UE.

* * * * *